RELAY STORAGE AND READOUT DEVICE

Filed Jan. 26, 1956 10 Sheets-Sheet 1

INVENTORS
Robert E. McGayhey
Edwin R. Wooding
BY
Joe L. Koerber
ATTORNEY

RELAY STORAGE AND READOUT DEVICE

Filed Jan. 26, 1956 10 Sheets-Sheet 2

INVENTORS
Robert E. McGayhey
Edwin R. Wooding
BY
Joel L. Koesler
ATTORNEY

Nov. 4, 1958 R. E. McGAYHEY ET AL 2,858,888

RELAY STORAGE AND READOUT DEVICE

Filed Jan. 26, 1956 10 Sheets-Sheet 8

Nov. 4, 1958 R. E. McGAYHEY ET AL 2,858,888

RELAY STORAGE AND READOUT DEVICE

Filed Jan. 26, 1956 10 Sheets-Sheet 9

INVENTORS
Robert E. McGayhey
Edwin R. Wooding
BY
Joe L. Koerber
ATTORNEY

United States Patent Office 2,858,888
Patented Nov. 4, 1958

2,858,888

RELAY STORAGE AND READOUT DEVICE

Robert E. McGayhey, Glenham, and Edwin R. Wooding, Poughkeepsie, N. Y., assignors to International Business Machines Corporation, New York, N. Y., a corporation of New York Application January 26, 1956, Serial No. 561,510

12 Claims. (Cl. 164—113)

This invention relates to a recording machine and more particularly to a machine provided with a keyboard and having storage devices between the keyboard and the recording control elements.

It is well known to control a record punch from a manual keyboard and even to provide storage of keyed data between the keyboard and the punch control elements in order to permit keying of new data while the punch elements are being operated in accordance with data in the storage unit.

It is the principal object of this invention to provide an improved high speed manual punch.

Another object of the invention is to provide an improved data storage device intermediate a data source and a data recorder.

Yet another object of the invention is to provide a novel double storage device intermediate a data source and a data recorder.

A further object of the invention is to provide a novel device for automatically recording zeros to the left of a significant digit.

Still another object of the invention is to provide means for correcting erroneous data in storage prior to the recording of the erroneous data on a record.

Other objects of the invention will be pointed out in the following description and claims and illustrated in the accompanying drawings, which disclose by way of example, the principle of the invention and the best mode, which has been contemplated, of applying that principle.

Fig. *4a* illustrates an auxiliary card.

Fig. *4b* illustrates a program card.

Fig. *4c* illustrates a detail card.

Figs. *5a*—*5g* illustrate the wiring diagram.

There are a number of well-known record punches, for example the IBM card punch, type 026, which are controlled through a manual keyboard to control punch elements for perforating a record in accordance with the keys which are operated.

The machine in which the invention is illustrated may be mechanically identical to the machine shown and described in Patent 2,647,581 issued August 4, 1953, to E. W. Gardinor et al. Only so much of the mechanical portion of the machine as is necessary to the understanding of this invention will be described. Reference may be made to the above patent for the details of the mechanical structure and operation. The circuitry for the machine is shown in the accompanying drawings and is described hereinafter.

In the following description of the machine, reference numbers below 100 are reserved for various relays. Numbers from 100 to 199 primarily refer to mechanical elements and numbers above 200 refer to circuitry.

Figure 1:
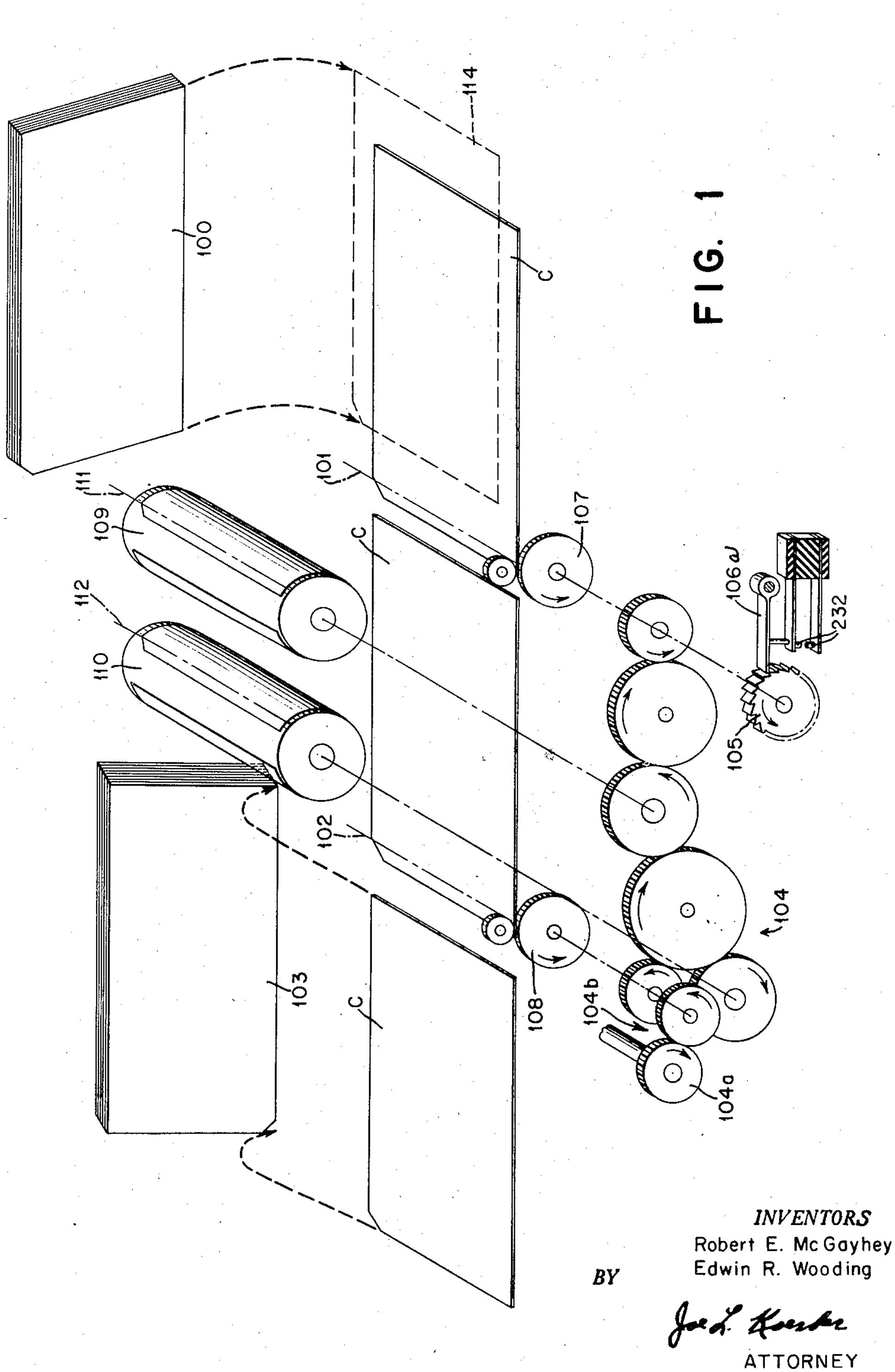
Fig. 1 is a schematic representation of a card punch.

Referring to Fig. 1, the machine comprises a card feed hopper 100, a punch station represented by a line 101, a read station represented by a line 102, a card stacker hopper 103, a gear train 104, an escape wheel 105, an escape magnet 106 represented in Fig. 1 by its armature 106*a*, card advancing wheels 107 and 108, a program drum 109 and an auxiliary drum 110. Read lines 111 and 112 are indicated on the respective drums 109 and 110. The drums 109 and 110 are mounted for rotation by the gear train 104.

The machine is driven by a constantly running motor M, illustrated in Fig. *5a*. A card feed shaft is engageable with a constantly driven shaft through an electrically actuated, single revolution card feed clutch. When the clutch is actuated a card feed cycle is initiated during which a record C card is fed from the hopper 100 to a pre-registration station 114. During a subsequent card feed cycle the card at 114 is registered at the Punch Station 101 preparatory to the punching therein of coded holes under control of a keyboard and another card is advanced to the pre-registration station 114.

A gear 104*a* in the gear train 104 is constantly rotated, and through a friction clutch 104*b*, tends to drive the gear train 104, the card feed wheels 107 and 108 and the drums 109 and 110. The gear train is restrained by the escape magnet armature 106*a*. When the escape magnet 106, Fig. *5a*, is energized, the gear train is free to rotate until the escape magnet is deenergized.

When a card is advanced through the Punch Station 101 and the Read Station 102, it is stacked in the hopper 103 by a stacking mechanism, not shown, but controlled through the same single revolution clutch as is the card feed shaft. The card feed shaft carries a number of cams which control contacts designated CF followed by a digit suffix. The contacts are operated during each card feed cycle to control various functions of the machine as described hereinafter.

Figures 2, 3:
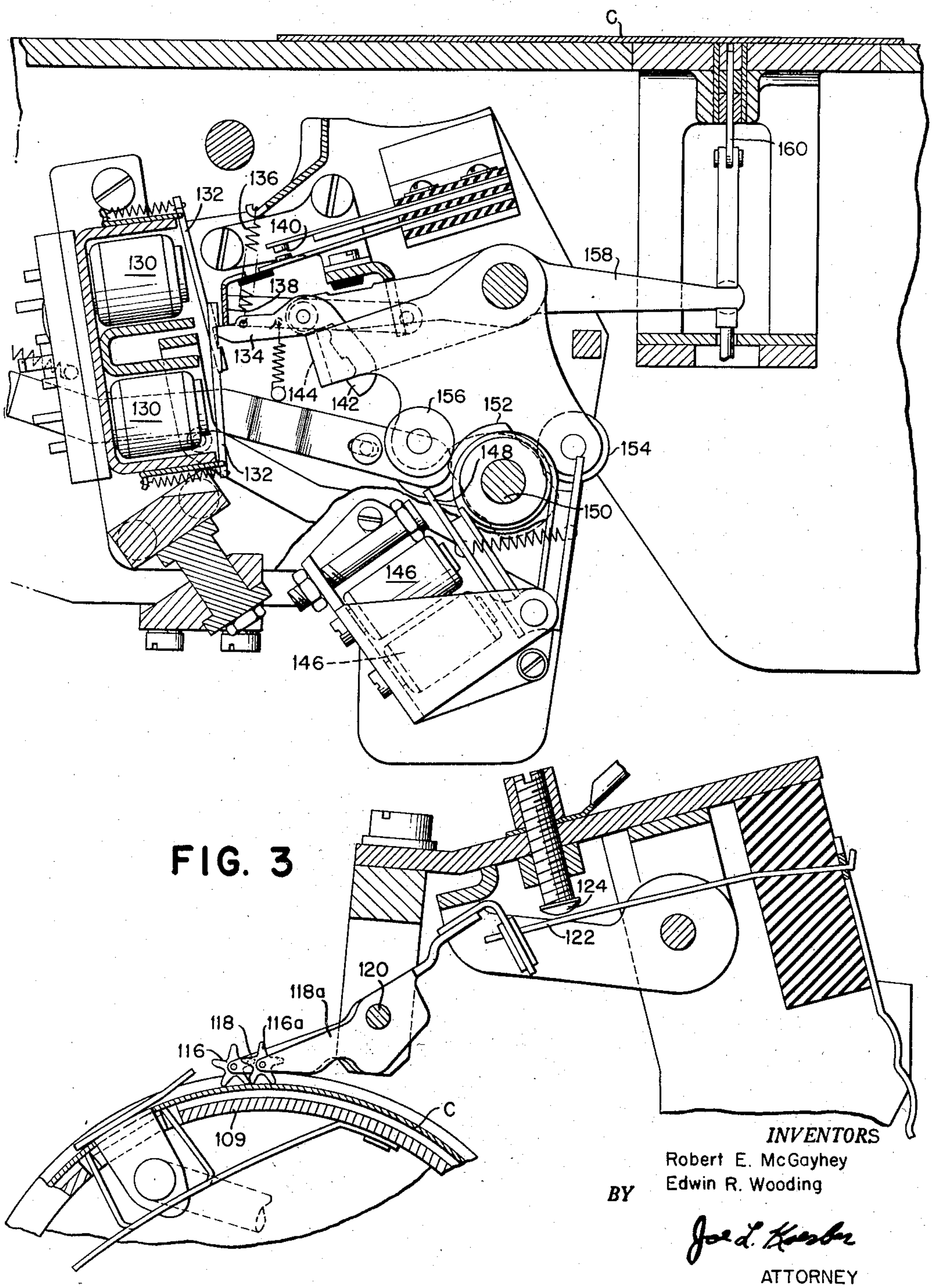
Fig. 2 is a sectional view showing punch actuating mechanisms.
Fig. 3 shows a program card sensing device.

The drums 109 and 110 each mounts a record card containing perforations which are sensed synchronously with the advance of a record card through the Read or Punch Stations. Referring to Fig. 3, a star wheel sensing mechanism is shown for sensing the auxiliary and program cards. The description of one sensing device will suffice for both. As the drum 109 is rotated, successive columns of the card mounted thereon pass a sensing line formed by a plurality of star wheels 116 mounted on arms 118. Note that a star wheel 116*a* is mounted on a short arm 118*a* to sense a card column after it has advanced one column past the normal read line. The arms 118 are pivoted at 120 and on the ends opposite the star wheels carry contact elements 122. The star wheels slide on two points along the card until a hole is encountered at which time one point drops into the hole rocking the associated arm counterclockwise and raising the arm 122 against a contact element 124. Hereinafter the contacts comprising elements 122 and 124 are referred to as star wheel contacts according to the index positions which they sense on the card. For example, contacts operated by the sensing of a "7" hole are referred as "7" star wheel contacts.

Referring to Fig. 2, the punching mechanism is shown. When a punch interposer magnet 130 is energized, it attracts its armature 132 thereby releasing a related punch interposer 134 which is biased in a clockwise direction by a spring 136. Each time a punch interposer is actuated, it acts on a punch interposer bail 138 to actuate two pairs of contacts 140 which are called front and rear interposer bail contacts. A hooked end 142 of the punch interposer swings under a punch bail 144.

A pair of parallel connected Punch Clutch Magnets 146 are energized through the contacts 140 and attract their common armature 148 to engage a spring clutch, which is described in detail in the hereinbefore cited patent, to rotate a punch shaft 150 in a so-called punch cycle. Through a cam 152 and cam followers 154 and 156, the punch bail 144 is rocked first counterclockwise and then clockwise. On the counterclockwise movement, punch arms 158, upon which actuated ones of the interposers 134 are mounted, raise associated punch elements 160 to perforate a card C. On the clockwise movement the punch is restored to its normal lowered position. The punch shaft 150 carries a number of cams which actuate cam contacts each time the shaft is rotated to control various functions of the machine. The various contacts are designated P followed by a digit suffix.

CIRCUIT DESCRIPTION

Figure 5A:
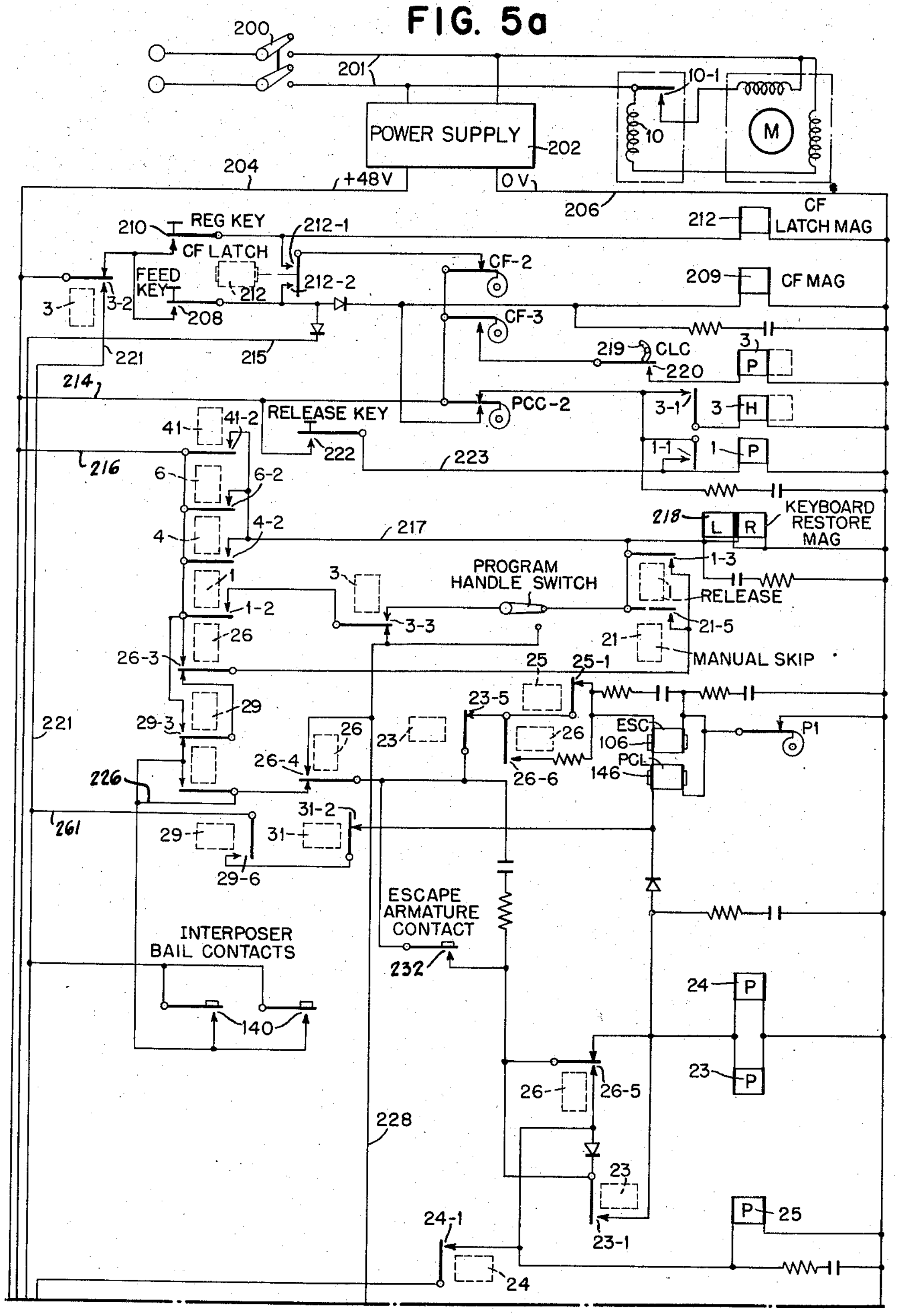

The circuitry for this machine is shown in Figs. 5*a* through 5*g*. Referring to Fig. 5*a*, a switch 200 connects the machine to any suitable power supply and through lines 201 energizes a motor M which is then held energized through contacts 10—1 of a relay 10 connected in parallel with the motor. Any suitable conventional power supply 202 may be connected across the input lines 201 to provide +48 volts on a line 204 and zero volts on a line 206. When a Feed Key 208 is depressed it closes its contacts and completes a circuit from the line 204 through normally closed contacts 3—2 of a relay 3, through the contacts 208 and a card feed magnet 209 to the line 206 thereby energizing the magnet 209 and initiating a card feed cycle in the manner described hereinbefore. When a feed cycle is initiated through the key 208, a parallel circuit through a line 215 energizes an Error Reset relay 6, in Fig. 5*c*, the purpose of which is described hereinafter.

If it is desired to register a card at the Punch Station without feeding another card from the card feed hopper, a Register Key 210, Fig. 5*a*, may be depressed thereby completing a circuit from the line 204 through the normal contacts 3—2, the Register Key 210, and the coil of a card feed latch magnet 212, to the line 206. The magnet 212 latches up the card feed knives, thereby inhibiting the feeding of a card during the card feed cycle which is initiated through the following circuit: From the line 204 through the normal contacts 3—2, the Register Key contacts 210, contacts 212—1 and 212—2 operated by the magnet 212, through the card feed magnet 209 to the line 206. Similarly, relay 6 is energized, in parallel, through the line 215. When relay 6 is energized, a circuit is completed from line 204 through a line 216, Fig. 5*a*, now closed contacts 6—2, a line 217 and a keyboard restore magnet 218 to the line 206, thereby effecting restoring of the latch type keyboard described in the hereinbefore cited patent.

During operation of the machine it is desired, as each card escapes from the Punch Station, that a card feed cycle be initiated automatically to feed another card from the card hopper and to register a new card at the Punch Station. Program Cam Contacts 2 (PCC–2) mounted on the program drum are operated after the last column of the card has passed the Punch Station. A circuit is then completed from the line 204 through a line 214, Fig. 5*a*, the transferred contacts PCC–2 and the card feed magnet 209 to the line 206, thereby initiating a card feed cycle.

When a card moves into registration position at the Punch Station, it engages a card lever 219 to close contacts 220, Fig. 5*a*, thereby completing a circuit from the line 204 through the line 214, card feed contacts CF3 operated by a cam on the card feed shaft, through the card lever contacts 220 and the pick coil of relay 3 to the line 206. Relay 3 transfers its contacts including contacts 3—2 thereby completing a circuit from the line 204, Fig. 5*a*, through the contacts 3—2 transferred to a line 221 to which many of the subsequently described circuits are connected. The line 221, during normal operation of the machine, becomes a +48 volt line. When the contacts CF3 reopen at the end of the card feed cycle, the relay 3 is held by a circuit extending from the line 204 through the line 214, the normally closed contacts PCC–2, the transferred contacts 3—1 and a hold coil of the relay 3 to the line 206.

A Release Key 222, Fig. 5*a*, is provided to release a card from the Punch Station without registering another card at the Punch Station. This is accomplished through a circuit extending from the line 204, through the line 214, the Release Key contacts 222 and a line 223, through the pick coil of a relay 1, to the line 206. Relay 1 is held energized until the card has left the Punch Station, through a circuit from the line 204, line 214, contacts PCC–2 normal, contacts 1—1 and relay 1 to the line 206. Contacts PCC–2 open as the card leaves the Punch Station. The escape magnet 106, Fig. 5*a*, is then energized through a circuit extending from the line 204 through the line 216, the now closed contacts 1—2 of the relay 1, the transferred contacts 3—3 (if there is a card at the Punch Station) through a closed manually operated Program Handle Switch, through the now closed contacts 1—3, the normal contacts 26—3 of a skip relay 26, the normal contacts 29—3 of a duplicate relay 29, also in Fig. 5*b*, through a line 226, the normal contacts 26—4, the normal contacts 23—5 of an escape interlock relay 23, Fig. 5*a*, the normal contacts 25—1 of a relay 25, Fig. 5*a*, through the escape magnet 106 and the cam contacts P1 to the line 206.

Figure 5B:
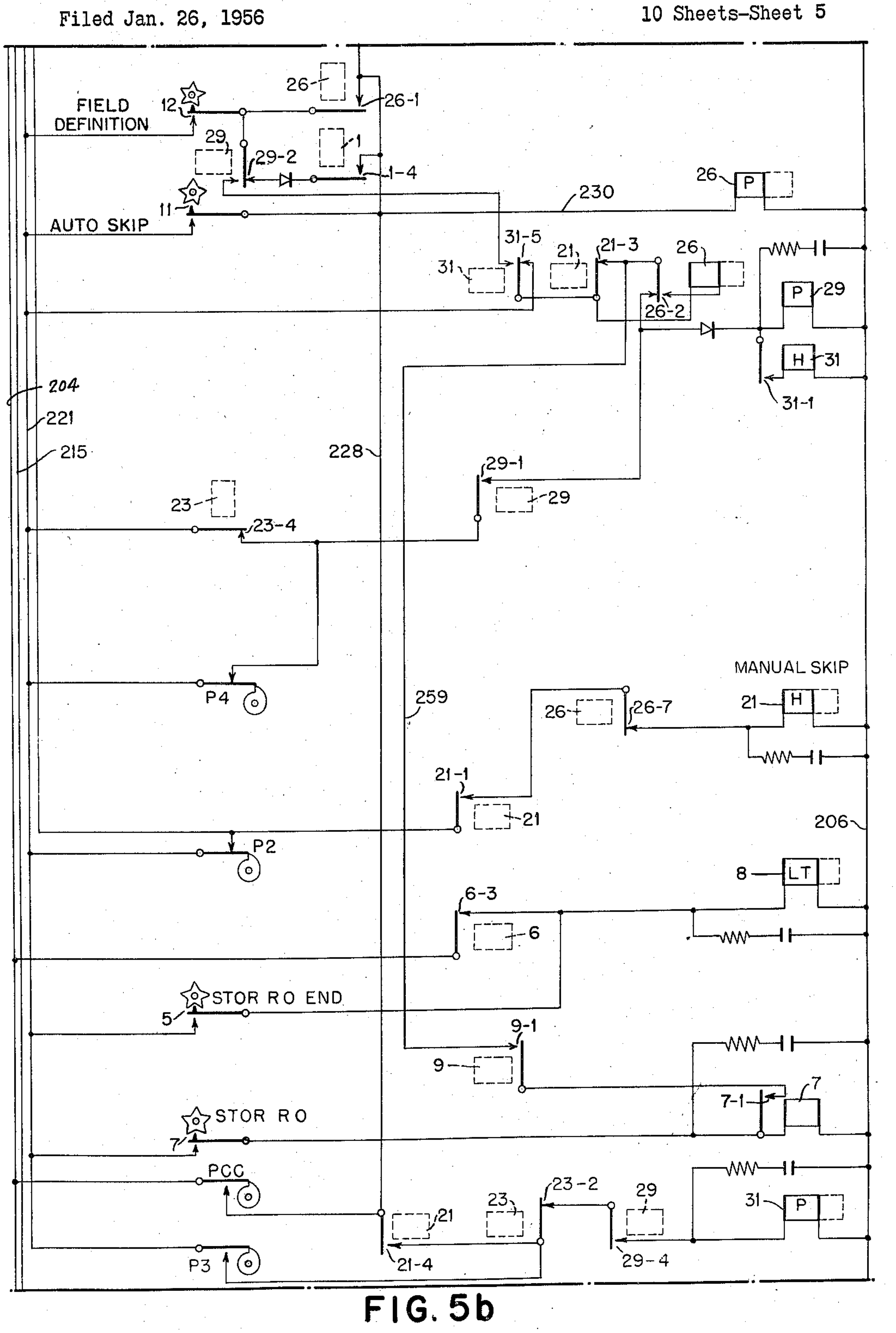

If there is not a card at the Punch Station the relay 3 is not energized and when the Release Key is operated, relay 1 is energized as before; however, a circuit is now completed from the line 204, line 216 through contacts 1—2, normal contacts 3—3, line 228, line 230, Fig. 5*b*, skip relay 26P to the line 206. The relay 26 contacts transfer and a circuit is complete from the line 228, Fig. 5*a*, through contacts 26—4 transferred, 23—5 normal, 25—1 normal, through the escape magnet 106 and contact P1 to the line 206. Another circuit is complete from the line 228, Fig. 5*a*, through escape armature contacts 232, shown also in Fig. 1, which are operated by the escape magnet 106. Relays 23, 24 and 25, Fig. 5*a*, are thereby energized breaking the circuit to the escape magnet 106 at contacts 23—5 and 25—1. Contacts 232 return to normal deenergizing relays 23, 24 and 25 and re-establishing the escape magnet circuit. The card is escaped in a column by column manner.

Figure 5C:
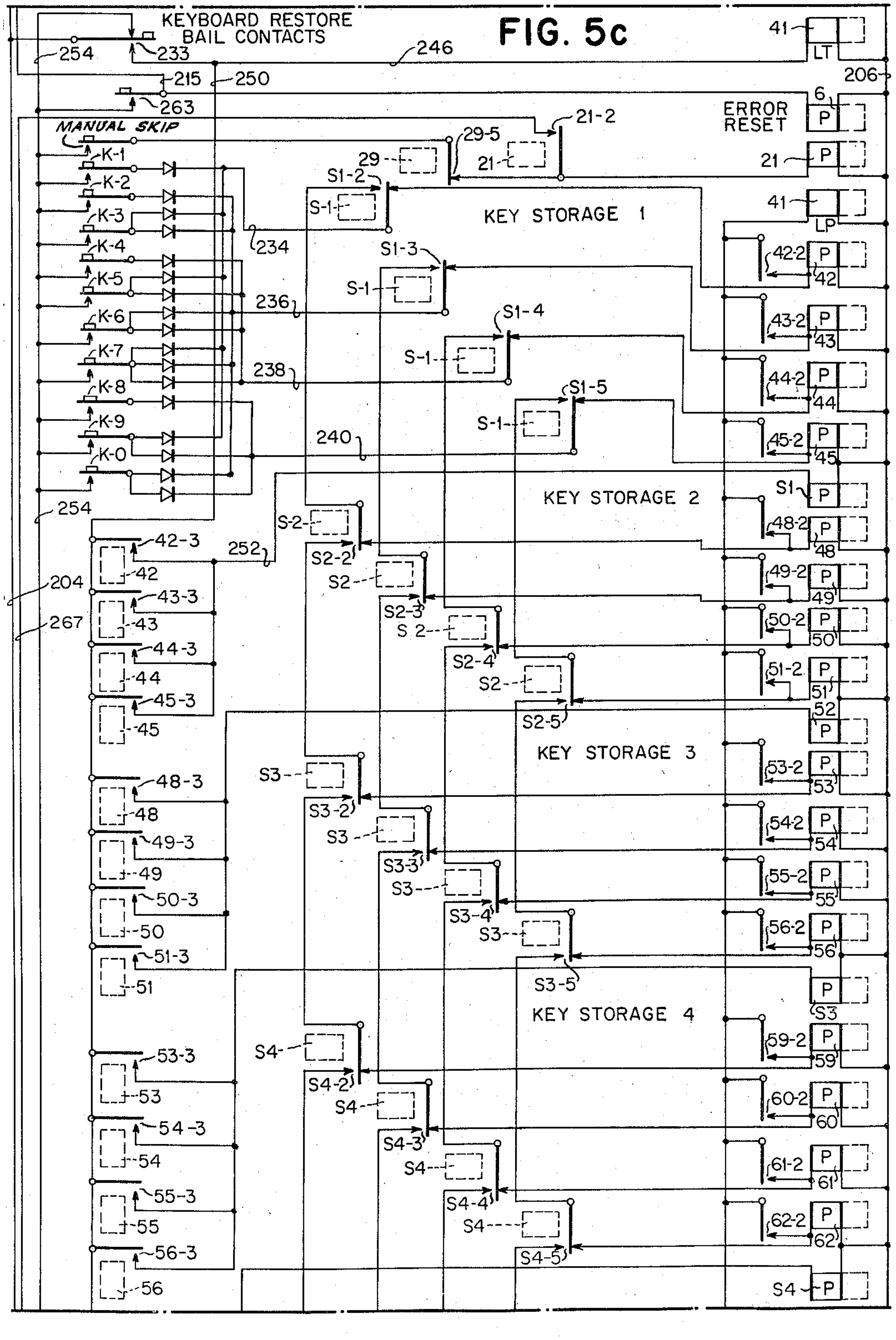

Referring to Fig. 5*c*, the contacts of a keyboard are shown and designated K1 through K0 representative of the digits 1 through 9 and zero. When one of the keys is operated, it closes its associated contacts completing a circuit from the line 204 through normally closed keyboard restore bail contacts 233 through appropriate key contacts and one or more diodes to lines designated 234, 236, 238 and 240 in accordance with a particular code. Other diodes are provided at various points in the circuit to prevent back circuits. The lines 234, 236, 238 and 240 represent, respectively, code bits 1, 2, 4 and 8 of a binary code. For example, depressing the key K1 completes a circuit to the line 234 (1). Depressing the key K2 completes a circuit to the line 236 (2). Depressing the key K3 completes a circuit to the lines 234 and 236 (1+2=3). Depressing the key K4 completes a circuit to the line 238 (4). Depressing the key K5 completes a circuit to the lines 234 and 238 (1+4=5). Depressing the key K6 completes circuits to the lines 236 and 238 (2+4=6). Depressing the key K7 completes circuits to the lines 234, 236 and 238 (1+2+4=7). Depressing the key K8 completes circuits to the line 240 (8). Depressing the key K9 completes circuits to the lines 234 and 240 (1+8=9). Depressing the key K9 completes circuits to the lines 234 and 240 (1+8=9). Depressing the key K0 completes circuits to the lines 236 and 240 (2+8 to represent a zero).

Figure 5D:
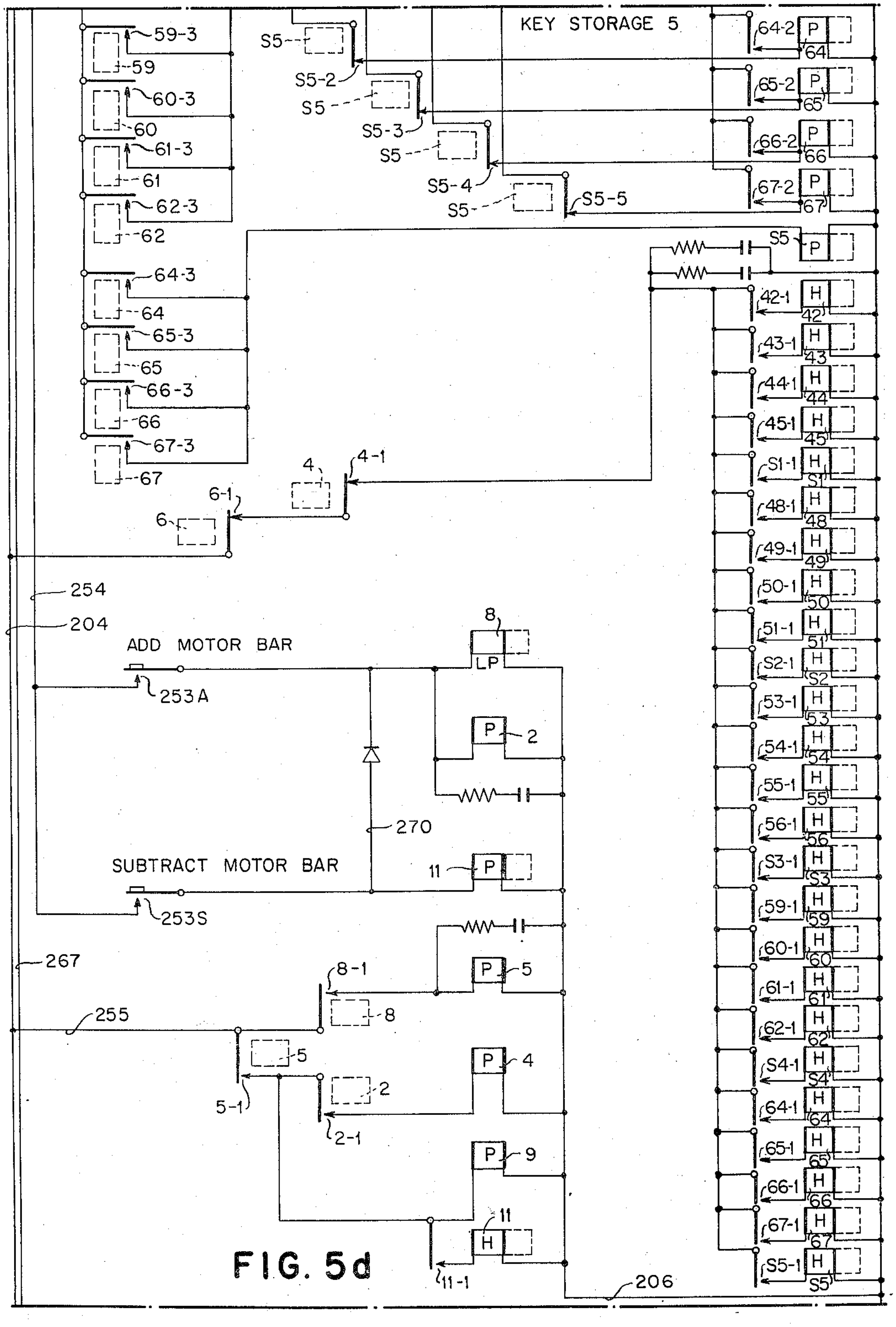

Referring to Figs. 5*c* and 5*d*, relays 42, 43, 44 and 45, represent the code bits 1, 2, 4 and 8 respectively of a first storage position designated Key Storage 1 (KS–1);

relays 48, 49, 50 and 51, represent the 1, 2, 4 and 8 bits of KS–2; relays 53, 54, 55 and 56, represent the code bits 1, 2, 4 and 8 of KS–3; relays 59, 60, 61 and 62, represent the code bits 1, 2, 4 and 8 of KS–4; and relays 64, 65, 66 and 67, represent the code bits 1, 2, 4 and 8 of KS–5. A Column Shift relay designated S1 is associated with KS–1, and through its contacts S1–2, S1–3, S1–4 and S1–5, transfers the keyboard circuits from the KS–1 relays 42, 43, 44 and 45 to the KS–2 relays 48, 49, 50 and 51. Similarly, a Column Shift relay S2 is associated with KS–2, and transfers the keyboard circuits from the KS–2 relays to the KS–3 relays 53, 54, 55 and 56. A Column Shift relay S3 similarly transfers the keyboard circuits from the KS–3 relays to the KS–4 relays 59, 60, 61 and 62. A Column Shift relay S4 transfers the circuits from the KS–4 to the KS–5 relays 64, 65, 66 and 67. A Column Shift relay S5 is associated with KS–5. The Column Shift relays are energized in the following manner. When one of the keys K1 through K0 is operated, for example the 5 key, and the keyboard is connected to KS–1, relays 42 and 44 are energized to represent a 5 (1+4). The contacts 44–2 and 42–2 are transferred completing a circuit in parallel, through the contacts 44–2 and 42–2, and through a latch pick relay 41LP, shown in Fig. 5*c*, to the line 206. Contacts 41–2 of the relay 41 complete a circuit from the line 204 through the contacts 41–2, the line 217 and the Keyboard Restore Magnet 218 thereby restoring the keyboard in the manner described hereinbefore. When the keyboard is restored the key contacts open and deenergize the KS pick relays 42 and 44 in Fig. 5*c*. As digits are stored in KS–1 through KS–5, energizing circuits are immediately set up for the corresponding hold relays, as shown in Fig. 5*d*, from the line 204 through the normally closed relay contacts 6—1, the normally closed relay contacts 4—1, through the number 1 relay contacts of any energized KS relays 42 through 67. Similarly, hold circuits are provided for the column shift relays S1, S2, S3, S4 and S5.

The Keyboard Restore bail contacts 233, shown in Fig. 5*c*, are transferred in the manner described hereinbefore, thereby completing a circuit from the line 204, through the transferred bail contacts 233, a line 246 and a latch trip relay 41LT to the line 206, thereby unlatching the latch pick relay 41LP. A circuit is also completed from the line 246 through a line 250, the contacts 42—3 and 44—3 in parallel, through a line 252 and the Column Shift relay S1 to the line 206. At this time, the relay S1, through its contacts S1–2, S1–3, S1–4 and S1–5, connects the keyboard to KS2. As successive keys are operated, successive KS positions are filled in order and subsequent Column Shift relays S2—S5 are energized in the manner just described for relay S1.

As described herein, the Key Storage has a capacity of five digits. When a number comprising any number of digits up to five has been keyed into storage. Motor Bar 253A or 253S, (253 Add or 253 Subtract), shown in Fig. 5*d*, is operative for transferring the data from Key Storage (KS) to Punch Storage (PS) illustrated in Fig. 5*e*. Punch Storage positions PS–1 through PS–5 are provided corresponding to the Key Storage positions KS–1 through KS–5. The Motor Bar 253A is provided for use with plus quantities and the Motor Bar 253S for minus quantities.

*Example*

An exemplary operation will be described to clearly illustrate the operation of the machine. Assume that each detail card processed in the machine is to have data punched in a five column field extending from column 36 of an eighty column card to column 40. Zero to five significant digits are to be punched in this field and zeros are to be punched in otherwise unused columns to the left of the most significant digit. For example, if the number 870 is to be punched in a card, the operator will actuate the keys K8, K7 and K0 in that order, and the machine thereafter will punch 00870. If there are not any significant digits to be punched in a particular record, the field will be left blank.

Figures 4A, 4B, 4C:
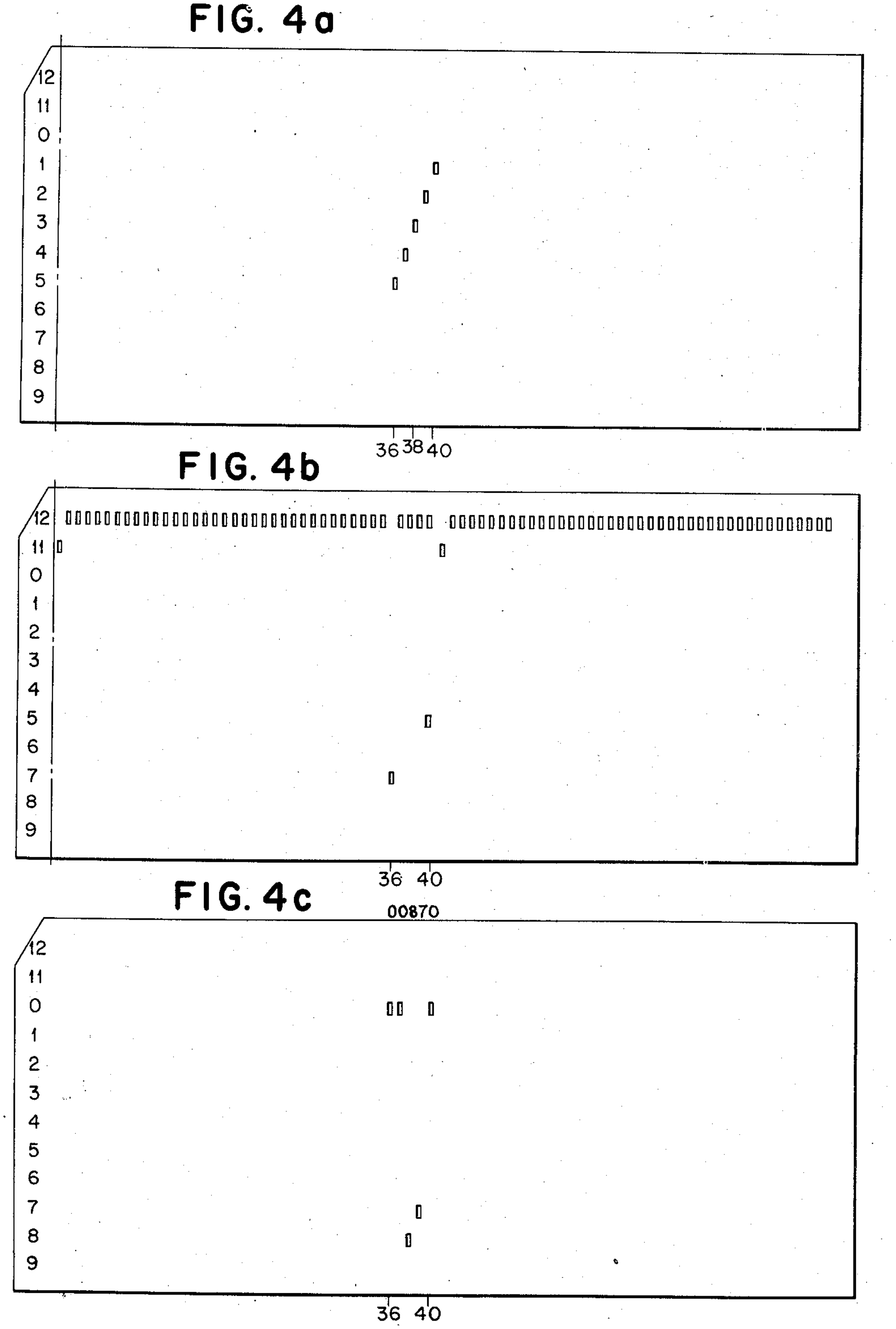

Referring to Figs. 4*a*, 4*b* and 4*c*, three record cards are shown. The auxiliary card in Fig. 4*a* is mounted on the auxiliary drum 110 and contains perforations in the following index positions.

| Column: | Index positions |
|---|---|
| 36 | 5 |
| 37 | 4 |
| 38 | 3 |
| 39 | 2 |
| 40 | 1 |

Circuits, to be described, are completed through the perforations "5," "4," "3," "2" and "1" to effect the reading of data from Punch Storage for recording respectively in columns 1, 2, 3, 4 and 5 of the selected field.

The program card shown in Fig. 4*b* is mounted on the program drum 109. An "11" hole is punched in column 1 of the program card to initiate a skip operation as soon as a card is registered at the punch station, and "12" holes are punched in columns 2 through 35 to continue the skip through column 35. The card will come to rest with column 36 at the sensing line 111 where the "7" hole is sensed. Readout from Key Storage initiated through the "7" hole is continued through "12" holes in columns 37 through 40. Readout from Punch Storage is initiated through the manual Motor Bar 253A or 253S and is stopped after column 40 by the sensing of a "5" hole in the program card Fig. 4*b*. At column 41, an "11" hole initiates another skip which is continued through the "12" holes as described hereinbefore. When column 80 of the card passes the punch station, an automatic feed cycle is initiated as described to register a new card at the Punch Station which is then advanced to column 36 by the automatic skip operation. While the data is being read out of Punch Storage and punched in the detail card, and a new card is being fed into the Punch Station, the operator may be keying data for the next card into Key Storage.

The detail card in Fig. 4*c* illustrates the number 00870 punched in columns 36 through 40.

Assume that a plus quantity 870 has been keyed into Key Storage. KS–1 contains the digit 8 represented by energized relay 45; KS–2 contains the digit 7 represented by energized relays 48, 49 and 50; KS–3 contains the digit 0 represented by energized relays 54 and 56; KS–4 and KS–5 have not been used since the stored quantity comprises only three digits. When the Add Motor Bar 253A is operated, the digits 8, 7 and 0 in Key Storage positions KS–1, KS–2 and KS–3 are transferred in parallel to Punch Storage positions PS–1, PS–2 and PS–3. The Column Shift relays S1, S2 and S3 were energized, and corresponding Punch Storage Column Shift relays S6, S7 and S8 are energized. Punch Storage Column Shift relays S9 and S10 corresponding respectively to Key Storage Column Shift relays S4 and S5 remain unenergized.

When the Add Motor Bar 253A is operated, its contacts close completing a circuit from the line 204, through the normal Keyboard Restore bail contacts 233, Fig. 5*c*, a line 254, the Motor Bar contacts 253A, Fig. 5*d*, a latch pick relay 8LP and, in parallel, through a relay 2, to the line 206. A circuit is then completed from the line 204 through a line 255, Fig. 5*d*, the now closed contacts 8—1, Fig. 5*d*, and a relay 5 to the line 206. Another circuit is completed from the line 255 through the now closed contacts 5—1, through a relay 9 to the line 206, and, in parallel, through the now closed contacts 2—1 and a relay 4 to the line 206.

Figure 5E:
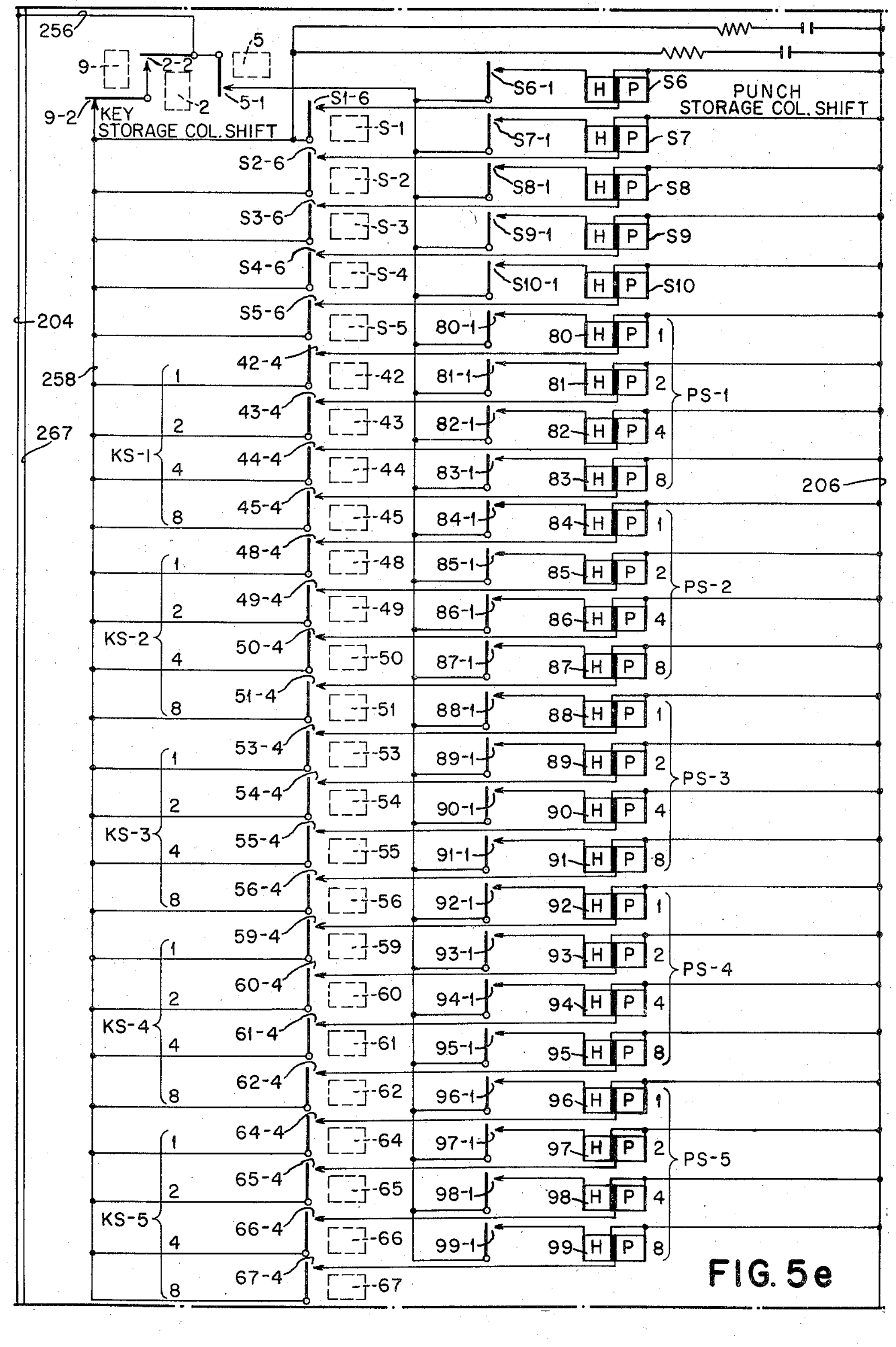

Referring to Fig. 5*e*, the Punch Storage Column Shift relays S6, S7, S8, S9 and S10 are shown opposite the corresponding Key Storage Column Shift number 6 points of relays S1, S2, S3, S4 and S5. Similarly, Punch Storage positions PS–1, PS–2, PS–3, PS–4 and PS–5 comprising binary coded (1, 2, 4, 8) relays are shown opposite the number 4 points of corresponding Key Storage relays.

When the parallel circuits are completed through relays 8 and 2, Fig. 5*d*, both relays are energized. A circuit, Fig. 5*e*, is completed from the line 204, through a line 256, now closed contacts 2—2 and normally closed contacts 9—2 to a line 258. This circuit is completed prior to the energizing of relay 9 which is delayed since relay 5 must be energized through contacts 8—1 before relay 9 can be energized through the normally open contacts 5—1. Referring again to the example wherein digits 8, 7 and 0 are stored in KS–1, KS–2 and KS–3, parallel circuits are completed from the line 258 through the relay contacts 45—4, 48—4, 49—4, 50—4, 54—4 and 56—4 and through PS pick coils 83, 84, 85, 86, 89 and 91, thereby storing in those PS–1, PS–2 and PS–3 relays, the same data as is contained in the KS–1, KS–2 and KS–3 relays. Hold circuits for the PS relays extend from the line 204 through line 256, now closed contacts 5—1 and in parallel through the now closed relay contacts 83—1, 84—1, 85—1, 86—1, 89—1 and 91—1. The latter circuits hold the PS relays energized when relay 9 is energized immediately after relay 5 and the contacts 9—2 open to deenergize the PS pick coils. Similarly, the Column Shift relays S6 through S10 are held through their contacts S6–1 through S10–1.

At the time relay 4, Fig. 5*d*, is energized through relay contacts 5—1 and 2—1, the data has already been transferred from Key Storage to Punch Storage, and the Key Storage hold relays in Fig. 5*d*, are deenergized when the normally closed contacts 4—1 open. Another situation may arise where the operator realized that an incorrect number has been stored in Key Storage. The operator, before operating a Motor Bar, depresses an Error Reset key 263, Fig. 5*c*, completing a circuit from the line 204, through the normal contacts 233, Fig. 5*c*, the line 254, through the contacts 263 and the Error Reset relay 6 to the line 206. The contacts 6—1, Fig. 5*d*, open to deenergize the KS hold relays 42H through 67H. The contacts 6—2 in Fig. 5*a*, close completing a circuit from the line 204, through the line 216, contacts 6—2, line 217 and Keyboard Restore Magnet 218 to the line 206, thereby restoring the keyboard.

The Motor Bars 253A and 253S are reset by the Keyboard Restore Magnet 218 which is energized through contacts 4—2 in Fig. 5*a*. Relay 2 is deenergized when the Motor Bar is restored and the contacts 253A or 253S open, since this relay is not needed after the data is transferred from Key Storage to Punch Storage. Relay 4 is deenergized as soon as contacts 2—1 open.

The digits 8, 7 and 0 must be read out of Punch Storage and punched 00870 in column 36 through 40 of a card which is at rest with column 35 aligned with the punch elements. Columns 36 of the auxiliary and program cards are aligned with their respective sensing devices. The auxiliary read device is sensing the "5" hole in column 36 and the program read device is sensing a "7" hole in column 36.

When the Motor Bar 253A was operated, the data in Key Storage was transferred to Punch Storage in the manner described hereinbefore. Referring to Fig. 5*b*, when the program card came to rest with its column 36 under the sensing devices, a circuit was completed from the line 221 through the "7" star wheel contacts of the program device and through the relay 7 pick coil to the line 206.

Relay 9 was energized, as described, and a circuit completed through the "7" star wheel contacts, relay contacts 7—1, 9—1, a line 259, the normal contacts 26—2 and duplicate relay 29 to the line 206. Referring to Fig. 5*a*, a circuit is now complete from the line 221 through a line 261, now closed relay contacts 29—6, normally closed relay contacts 31—2 ,the Punch Clutch Magnet 146 and the normally closed P1 contacts to the line 206, thereby energizing the Magnet 146. When the Magnet 146 is energized, it effects the rotation of the Punch Clutch Shaft 150, as shown and described hereinbefore. The Punch Shaft carries cams for operating the contacts P1, P2, P3, P4 and P5, also described hereinbefore. It will be noted that the Escape Magnet 106 was not energized and therefore the auxiliary program and detail cards remained stationary. The P3 contacts in Fig. 5*b* close energizing relay 31 through relay contacts 23—2 normal, 29—4 transferred and relay 31 to the line 206 to open contacts 31—2, Fig. 5*a*, and deenergize the Punch Clutch Magnet 146.

Figure 5F:
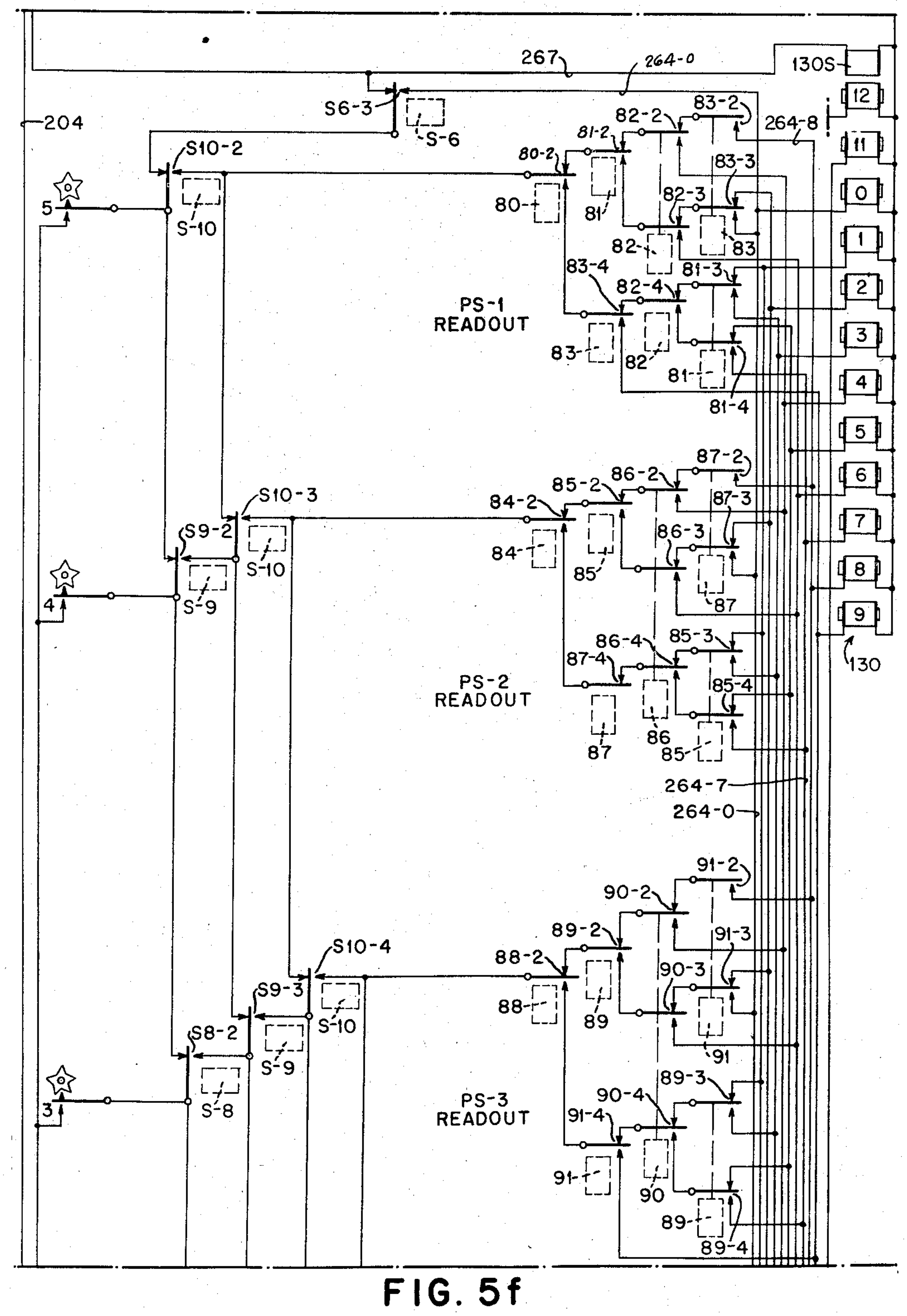
Figure 5G:
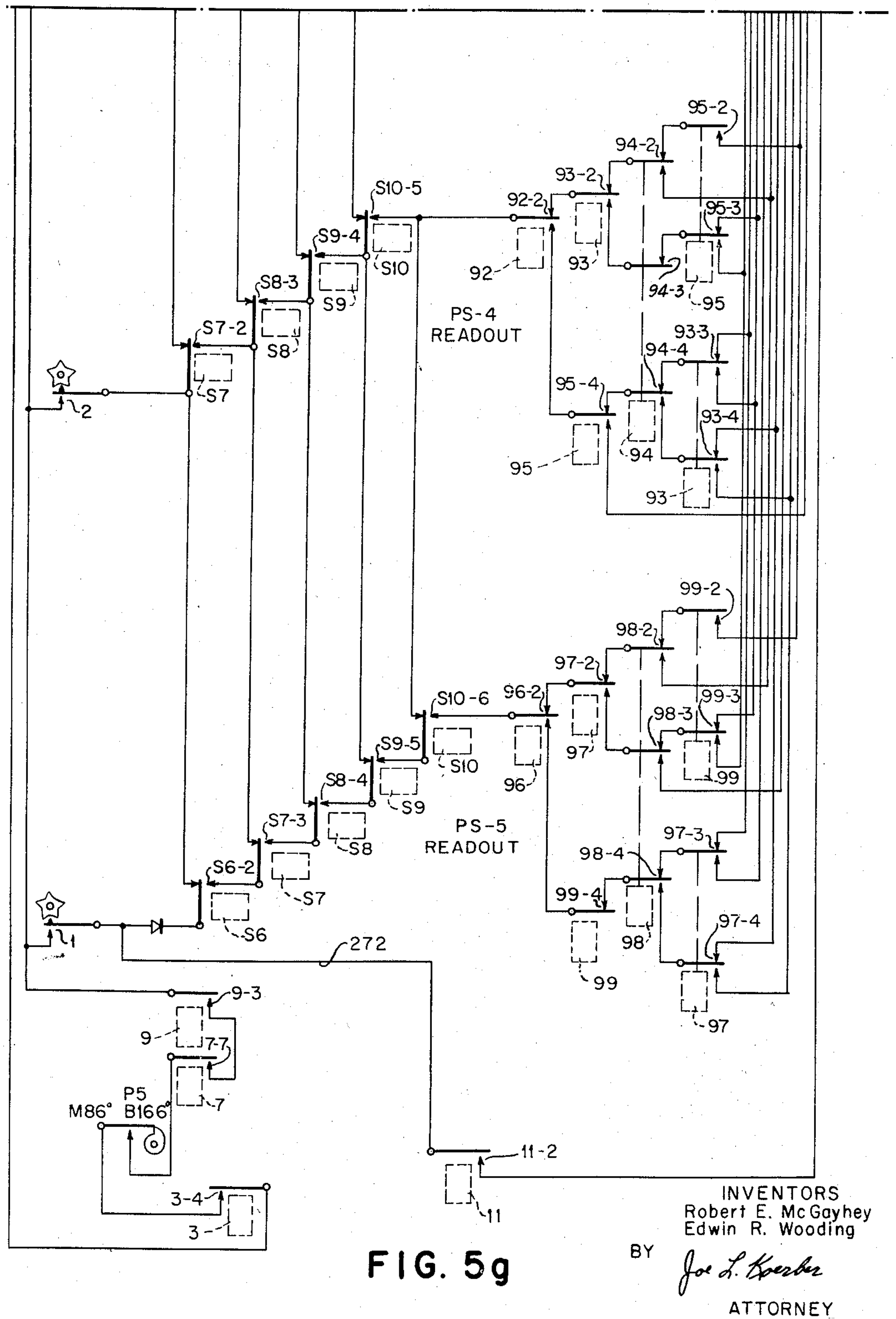

Since PS–1 contains an 8, only relay 83 is energized, and correspondingly, contacts 83—2, 83—3 and 83—4 in Fig. 5*f*, are transferred. Column Shift relays S6, S7 and S8 are energized so their respective contacts, in Figs. 5*f* and 5*g*, are transferred.. Column Shift relays S9 and S10 are not energized and their contacts are normal.

At P5 time of the punch cycle, a circuit is completed from the line 204 through the now closed relay contacts 3—4, Fig. 5*g*, the now closed P5 cam contacts, the relay contacts 7—7 which were operated through the "7" star wheel program contacts, through the relay contacts 9—3, the "5" star wheel contacts of the auxiliary card, the normal contacts S10–2, the transferred S6–3 contacts (indicating that at least one digit has been stored in Punch Storage), through a line 264—0 to the zero interposer magnet 130—0, thereby energizing the magnet 130—0 and actuating the related punch interposer 134, in the manner described hereinbefore. If S6 had not been energized, the pulse from the "5" star wheel contacts would have gone through the normally closed S6–3 contacts and a line 267 to a space interposer magnet 130S, Fig. 5*f*, since columns 36 through 40 are to remain unpunched in such cases.

When any punch interposer 134 is actuated, the interposer bail contacts 140, as shown in Fig. 5*a*, close, completing a circuit from the line 221 through the interposer bail contacts 140 and the normally closed relay contacts 26—4, normally closed relay contacts 23—5, normally closed relay contacts 25—1, the Escape Magnet 106 and the P1 contacts to the line 206, thereby initiating a one column escapement of the card at the punch station to align column 36 with the punch elements. At the same time columns 37 of the program and auxiliary cards are advanced to their respective read stations. When the Escape Magnet 106 is energized, it mechanically closes the Escape Armature Contacts 232, Fig. 5*a*, completing a circuit through the contacts 232 to the Escape Interlock relays 23 and 24, and in parallel through the Punch Clutch Magnet 146, thereby initiating a cycle of the Punch Shaft 150, referred to hereinbefore, during which cycle the digit 0 is punched in column 36 of the detail card at the Punch Station.

A second P5 pulse, Fig. 5*g*, is provided during that punch cycle for reading through the "4" star wheel contacts which closed in response to the sensing of a hole in column 37 of the auxiliary card. A circuit is completed through the "4" star wheel contacts, the normal S9–2 contacts, the normal S10–2 contacts, transferred S6–3 contacts, the line 264—0 and the zero interposer magnet 130—0, thereby initiating another one column escapement of the card at the Punch Station and the program and auxiliary cards and effecting the punching of a 0 in column 37 of the detail card.

A third P5 pulse is provided during the latter punch cycle, completing a circuit through the "3" star wheel contact of the auxiliary card, which is now positioned at column 38, through the transferred contacts S8–2, the normal contacts S9–3, the normal contacts S10–3, the normal contacts 80—2, 81—2, 82—2, the transferred contacts 83—2, to a line 264—8, and the interposer magnet 130—8 to the line 206. Through the interposer bail contacts 140, actuated by the energizing of the punch interposer magnet 130—8, an escapement and punch cycle is initiated during which an 8 is punched in column 38 of the detail card and a fourth P5 pulse is provided. PS–2 relays 84, 85 and 86 are energized indicating the storage of the digit 7. The auxiliary program card is now positioned at column 39 and a circuit is complete through the "2" star wheel contacts, the transferred contacts S7—2, the transferred contacts S8–3, the normal contacts S9–4, the normal contacts S10–4, the transferred contacts 84—2, the normal contacts 87—4, the transferred contacts 86—4 and the transferred contacts 85—4 to a line 264—7, through the interposer magnet 130—7 to the line 206, thereby actuating the corresponding punch interposer 134, operating the interposer bail contacts 140 and initiating the escapement and punch cycle, during which a 7 is punched in column 39 of the detail card and a fifth P5 pulse is provided for completing a circuit through the "1" star wheel contacts which are closed in response to the sensing of 1 hole in a column 40 of the auxiliary card. PS–3 relays 89 and 91 are energized to represent a keyed zero. The circuit through the "1" star wheel contacts extends through the transferred contacts S6–2, the transferred contacts S7–3, the transferred contacts S8–4, the normal contacts S9–5, the normal contacts S10–5, the contacts 88—2 normal, 89—2 transferred, 90—3 normal, and 91—3 transferred, through the line 264—0 and the zero punch interposer magnet 130—0 to the line 206 thereby initiating an escapement and punch cycle causing the punching of a zero in column 40 of the detail card. Note the different manner of energizing the zero interposer magnet 130—0 for automatic zeros to the left of a significant digit and for a keyed zero.

If a minus quantity had been in storage to be punched in a card, the Subtract Motor Bar 253S, Fig. *5d*, would have been operated and through a line 270, would have energized the relays 8LP and 2 in the same manner as by the Add Motor Bar 253A. However, in addition, a relay 11 would be energized and held through the circuit extending from the line 204, through the line 255, contacts 5—1, 11—1, through a hold coil 11H to the line 206. During the readout from Punch Storage through the "1" star wheel contacts of the auxiliary card, a parallel circuit is completed through a line 272, Fig. *5g*, and contacts 11—2 of the relay 11 to punch interposer magnet 130—11, thereby effecting the punching of an 11 hole in the same column as the digit 0 which is punched in column 40 of the card at the Punch Station. The 11 punch in this position, indicates a negative quantity and is useful during subsequent use of the punched card.

A short star wheel arm 118*a*, as shown in Fig. 3, is provided for the "5" star wheel of the program drum 109; therefore, the "5" hole in the column 40 of the program card is not sensed until the program card advances to present its column 41 to the normal sensing position. When column 40 of the detail card is advanced to the Punch Station, the "5" star wheel contacts of the program drum close, completing a circuit from the line 221, Fig. *5b*, through the "5" star wheel contacts and a latch trip relay 8LT. Energizing relay 8LT releases the contacts of relay 8LP, Fig. *5d*, which return to normal, deenergizing relay 5. Contacts 5—1 open, deenergizing relay 9 and, if energized, relay 11. The storage readout circuits are thereby disabled to prevent reading out and punching data which may be in subsequent columns of the detail card.

A skip operation is picked through the 11 program hole, Fig. *4b*, and held through the 12 program holes to skip out the card and initiate the feeding and registering of following cards.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A recording machine comprising, in combination, a plurality of recording devices arranged as a recording station, means for advancing a columnar record past said station in a column by column manner, first program means including a first columnar program and means for sensing data therein, second program means including a second columnar program and means for sensing data therein, means for synchronizing the sensing of said programs while advancing said record synchronously past said recording station, first data storage means, second data storage means, means operable for storing data in said first storage means, means operable for transferring data from said first storage means to said second storage means, means including said second program means for reading data serially from said second storage means for recording said data column by column in said record and means including said first program means for selecting the columns of said record in which said data is recorded.

2. A recording machine comprising, in combination, a plurality of recording devices arranged as a recording station, means for advancing a columnar record past said station in a column by column manner, first program means including a first columnar program and means for sensing data therein, second program means including a second columnar program and means for sensing data therein, means for synchronizing the sensing of said programs while advancing said record synchronously past said recording station, first data storage means having capacity for a plurality of digit representations, second data storage means having storage capacity equal to said first storage means, means operable for storing digit representations in said first storage means up to said capacity, means operable for transferring data from said first storage means to said second storage means, and means including said second program means for reading data serially from said second storage means for recording said data column by column in said record and for causing a number of zeros corresponding to the unused digit capacity of said second storage means to be recorded in said record to the left of the most significant of the stored digit quantities.

3. A recording machine comprising, in combination, a plurality of recording devices arranged as a recording station, means for advancing a columnar record past said recording station in a column by column manner, means operable for conditioning said devices, first actuating means for actuating conditioned ones of said devices, first data storage means comprising a plurality of sets of digit representing elements, elements of each set being actuatable selectively in combinations to represent digit quantities, second actuating means including a digit keyboard for actuating selected ones of the elements of said sets of elements, means for connecting said second actuating means successively with said sets of elements as successive digit keys are actuated, second data storage means comprising sets of other digit representing elements corresponding to said sets of digits representing elements of said first storage means, means operable for transferring data from sets of elements of said first storage means to corresponding sets of elements of said second storage means, and a program device for reading data serially out of said second storage means to control said recording devices for recording, column by column, the data stored in said second storage means.

4. The recording machine of claim 3, having means selectively operable for clearing erroneous data from said first storage means prior to operating said transferring means.

5. The recording machine of claim 3, having means controlled by said second storage means and operable through said program device for recording a zero for each unactuated set of said sets of other digit representing elements.

6. A recording machine comprising, in combination, a plurality of recording devices arranged as a recording station, means for advancing a columnar record past said station in a column by column manner, first program means including a first columnar program and means for sensing data therein, second program means including a second columnar program and means for sensing data therein, means for synchronizing the sensing of said programs while advancing said record synchronously past said recording station, first data storage means having capacity for a plurality of digit representations, second data storage means having storage capacity equal to said first storage means, means operable for storing digit representations in said first storage means up to said capacity, means for operable for transferring data from said first storage means to said second storage means, means including said second program means for reading data serially from said second storage means for recording said data column by column in said record and for causing a number of zeros corresponding to the unused digit capacity of said storage means to be recorded in said record to the left of the most significant of the stored digit quantities and means for initiating a spacing operation when the entire capacity of said second storage means is unused.

7. A recording machine comprising, in combination, a plurality of recording devices arranged as a recording station, means for advancing a columnar record past said recording station in a column by column manner, means operable for conditioning said devices, first actuating means for actuating conditioned ones of said devices, first data storage means comprising a plurality of sets of digit representing elements, elements of each set being actuatable selectively in combinations to represent digit quantities, second actuating means including a digit keyboard for actuating selected ones of the elements of said sets of elements, means for connecting said second actuating means successively with said sets of elements as successive keys are actuated, second data storage means comprising sets of other digit representing elements corresponding to said sets of digit representing elements of said first storage means, means operable for transferring data from sets of elements of said first storage means to corresponding sets of elements of said second storage means, a program device for reading data serially out of said second storage means to control said conditioning means for recording, column by column, the data stored in said second storage means, means controlled by said second storage means and operable through said program device for controlling said conditioning means for recording a zero for each unactuated set of said other digit representing elements and means for initiating a spacing operation when none of said sets of other digit representing elements are actuated.

8. A recording machine comprising, in combination, a plurality of recording devices arranged as a recording station, means for advancing a columnar record past said station in a column by column manner, first program means including a first columnar program and means for sensing data therein, second program means including a second columnar program and means for sensing data therein, means for synchronizing the sensing of said programs while advancing said record synchronously past said recording station, first data storage relays, second data storage relays, means operable for storing data in said first storage relays, means operable for transferring data from said first storage relays to said second storage relays, means including said second program means for reading data serially from said second storage relays for recording said data column by column in said record and means including said first program means for selecting the columns of said record in which said data is recorded.

9. A recording machine comprising, in combination, a plurality of recording devices arranged as a recording station, means for advancing a columnar record past said station in a column by column manner, first program means including a first columnar program and means for sensing data therein, second program means including a second columnar program and means for sensing data therein, means for synchronizing the sensing of said program while advancing said record synchronously past said recording station, first data storage relays having capacity for a plurality of digit representations, second data storage relays having storage capacity equal to said first storage relays, means operable for storing digit representations in said first storage relays up to said capacity, means operable for transferring data from said first storage relays to said second storage relays, and means including said second program means for reading data serially from said second storage means for recording said data column by column in said record and for causing a number of zeros corresponding to the unused digit capacity of said second storage relays to be recorded in said record to the left of the most significant of the stored digit quantities.

10. A recording machine comprising, in combination, a plurality of recording devices arranged as a recording station, means for advancing a columnar record past said recording station in a column by column manner, means operable for conditioning said devices, first actuating means for actuating conditioned ones of said devices, first data storage means comprising a plurality of sets of digit representing relays, relays of each set being actuable selectively in combinations to represent digit quantities, second actuating means including a digit keyboard for energizing selected ones of the relays of said sets of relays, means for connecting said second actuating means successively with said sets of relays as successive digit keys are actuated, second data storage means comprising sets of other digit representing relays corresponding to said sets of digit representing relays of said first storage means, means operable for transferring data from sets of relays of said first storage means to corresponding sets of relays of said second storage means, and a program device for reading data serially out of said second storage means to control said recording devices for recording, column by column, the data stored in said second storage means.

11. A recording machine comprising, in combination, a plurality of recording devices arranged as a recording station, means for advancing a columnar record past said sattion in a column by column manner, first program means including a first columnar program and means for sensing data therein, second program means including a second columnar program and means for sensing data therein, means for synchronizing the sensing of said programs while advancing said record synchronously past said recording station, first data storage relays having capacity for a plurality of digit representations, second data storage relays having storage capacity equal to said first storage relays, means operable for storing digit representations in said first storage relays up to said capacity, means operable for transferring data from said first storage relays to said second storage relays, means including said second program means for reading data serially from said second storage relays for recording said data column by column in said record and for causing a number of zeros corresponding to the unused digit capacity of said storage relays to be recorded in said record to the left of the most significant of the stored digit quantities and means for initiating a spacing operation when the entire capacity of said second storage relays is unused.

12. A recording machine comprising, in combination, a plurality of recording devices arranged as a recording station, means for advancing a columnar record past said recording station in a column by column manner, means operable for conditioning said devices, first actuating means for actuating conditioned ones of said devices, first data storage means comprising a plurality of sets of digit representing relays, relays of each set being energizable selectively in combinations to represent digit quantities, second actuating means including a digit keyboard for actuating selected ones of the relays of said sets of relays, means for connecting said second actuating means successively with said sets of relays as successive keys are actuated, second data storage means comprising sets of other digit representing relays corresponding to said sets of digit representing relays of said first storage means, means operable for transferring data from sets of relays of said first storage means to corresponding sets of relays of said second storage means, a program device for reading data serially out of said second storage means to control said conditioning means for recording, column by column, the data stored in said second storage means, means controlled by said second storage means and operable through said program device for controlling said conditioning means for recording a zero for each unactuated set of said other digit representing relays and means for initiating a spacing operation when none of said sets of other digit representing relays are actuated.

References Cited in the file of this patent

UNITED STATES PATENTS

| | | |
|---|---|---|
| 1,138,314 | Powers | May 4, 1915 |
| 1,258,809 | Potts | Mar. 12, 1918 |
| 2,131,914 | Carroll et al. | Oct. 4, 1938 |